(12) United States Patent
Lorenz et al.

(10) Patent No.: US 7,678,729 B2
(45) Date of Patent: Mar. 16, 2010

(54) PROCESS FOR THE PREPARATION OF POLYETHER POLYOLS

(75) Inventors: Klaus Lorenz, Dormagen (DE); Jorg Hofmann, Krefeld (DE)

(73) Assignee: Bayer MaterialScience AG, Leverkusen (DE)

( * ) Notice: Subject to any disclaimer, the term of this patent is extended or adjusted under 35 U.S.C. 154(b) by 212 days.

(21) Appl. No.: 11/804,546

(22) Filed: May 18, 2007

(65) Prior Publication Data

US 2007/0276099 A1    Nov. 29, 2007

(30) Foreign Application Priority Data

May 23, 2006   (DE) .................. 10 2006 024 025

(51) Int. Cl.
*B01J 27/26* (2006.01)
*B01J 31/00* (2006.01)

(52) U.S. Cl. ...................... 502/175; 502/159

(58) Field of Classification Search .......... 502/159, 502/175

See application file for complete search history.

(56) References Cited

U.S. PATENT DOCUMENTS

| 5,470,813 | A | 11/1995 | Le-Khac | 502/175 |
|---|---|---|---|---|
| 5,482,908 | A | 1/1996 | Le-Khac | 502/156 |
| 5,536,883 | A | 7/1996 | Le-Khac | 568/620 |
| 5,545,601 | A | 8/1996 | Le-Khac | 502/156 |
| 5,627,120 | A | 5/1997 | Le-Khac | 502/156 |
| 5,637,673 | A | 6/1997 | Le-Khac | 528/405 |
| 5,712,216 | A | 1/1998 | Le-Khac et al. | 502/175 |
| 5,714,428 | A | 2/1998 | Le-Khac | 502/159 |
| 5,777,177 | A | 7/1998 | Pazos | 568/679 |
| 5,789,626 | A | 8/1998 | Le-Khac | 568/620 |
| 5,919,988 | A | 7/1999 | Pazos et al. | 568/679 |
| 6,018,017 | A | 1/2000 | Le-Khac | 528/421 |
| 6,486,361 | B1 | 11/2002 | Ehlers et al. | |
| 6,586,566 | B1 | 7/2003 | Hofmann et al. | 528/425 |
| 7,008,900 | B1 | 3/2006 | Hofmann et al. | 502/175 |
| 2001/0046940 | A1 | 11/2001 | O'Connor et al. | 502/175 |
| 2005/0159627 | A1 | 7/2005 | Stosser et al. | 568/679 |

FOREIGN PATENT DOCUMENTS

| CA | 2 391 924 | | 5/2001 |
|---|---|---|---|
| DE | 203734 | A1 | 11/1983 |
| EP | 0 090 445 | | 5/1983 |
| WO | 98/52689 | | 11/1998 |
| WO | 03/080241 | A1 | 10/2003 |

OTHER PUBLICATIONS

Advances in Urethane Science & Technology, 14, (month unavailable) 1998, p. 151-218, Mihail Ionesou et al, "New Synthetic Pathways to Polyether Polyols for Rigid Polyurethane Foams".

*Primary Examiner*—Elizabeth D Wood
(74) *Attorney, Agent, or Firm*—N. Denise Brown; John E. Mrozinski, Jr.; Noland J. Cheung

(57) ABSTRACT

The present invention provides a process for conditioning double metal cyanide (DMC) catalysts, which are employed in the preparation of polyether polyols based on starter compounds having active hydrogen atoms, the preparation of polyether polyols using the conditioned catalysts and the use of the polyether polyols prepared in this way for the preparation of polyurethane materials.

3 Claims, No Drawings

PROCESS FOR THE PREPARATION OF POLYETHER POLYOLS

FIELD OF THE INVENTION

The present invention provides a process for conditioning double metal cyanide catalysts ("DMC catalysts"), which are employed in the preparation of polyether polyols based on starter compounds having active hydrogen atoms, the preparation of polyether polyols using the conditioned catalysts and the use of the polyether polyols prepared in this way for the preparation of polyurethane materials.

BACKGROUND OF THE INVENTION

Polyether polyols which are suitable for the preparation of polyurethane materials can be obtained via various preparation processes. On the one hand, the base-catalyzed addition of alkylene oxides to starter compounds having Zerewitinoff-active hydrogen atoms and on the other hand, the use of double metal cyanide compounds as catalysts for the addition of alkylene oxides to starter compounds having Zerewitinoff-active hydrogen atoms are of importance on the large industrial scale. The (Lewis) acid-catalyzed addition of alkylene oxides on to suitable starter compounds is of minor importance.

The base-catalyzed addition of alkylene oxides, such as, for example, ethylene oxide or propylene oxide, to starter compounds having Zerewitinoff-active hydrogen atoms is carried out in the presence of alkali metal hydroxides, alkali metal hydrides or also amines, such as N,N-dimethylbenzylamine or imidazole. After the addition of the alkylene oxides has taken place, the polymerization-active centers on the polyether chains must be neutralized with dilute mineral acids, such as sulfuric acid or phosphoric acid, or also organic acids, such as e.g. lactic acid, and the salts formed must be separated off, if appropriate. Working up of the alkaline polymers is also possible with the aid of acid laminar silicates or by means of acid cation exchangers. In amine-catalyzed alkylene oxide addition reactions, further working up can be omitted if the presence of the amines in these polyether polyols does not impair the preparation of polyurethane materials. In addition to the necessity of the polyether polyols having to be worked up, if appropriate, before their use as polyurethane components, two further disadvantages of the base-catalyzed addition of alkylene oxides on to starter compounds having Zerewitinoff-active hydrogen atoms are to be mentioned. Only polyethers having relatively low equivalent weights can be obtained via amine catalysis, in this context see, for example, Ionescu et al. in "Advances in Urethane Science & Technology", 1998, 14, p. 151-218. Under alkali metal hydroxide catalysis, undesirable side reactions increase significantly as the molar mass of the polymer increases. The isomerization of propylene oxide to allyl alcohol, which, at high equivalent weights (or low OH numbers), leads to a high content of monofunctional polyether species in the reaction mixture, is to be mentioned in particular here. The monofunctional polyether molecules have an adverse effect on the full curing properties and the profile of physical properties of polyurethane systems.

By employing double metal cyanide catalysts, it has become possible to speed up the addition of alkylene oxides, in particular propylene oxide, to starter compounds having Zerewitinoff-active hydrogen atoms down to very low OH numbers, without the abovementioned isomerization of propylene oxide to allyl alcohol occurring to a noticeable extent. Highly active DMC catalysts, which are described e.g. in U.S. Pat. No. 5,470,813, EP-A 700 949, EP-A 743 093, EP-A 761 708, WO 97/40086, WO 98/16310 and WO 00/47649, furthermore have an exceptionally high activity and render possible the preparation of polyether polyols at very low catalyst concentrations (25 ppm or less), so that it is no longer necessary to separate off the catalyst from the finished product. Typical examples are the highly active DMC catalysts described in EP-A 700 949, which, in addition to a double metal cyanide compound (e.g. zinc hexacyanocobaltate(III)) and an organic complexing ligand (e.g. tert-butanol), also contain a polyether having a number-average molecular weight of greater than 500 g/mol.

A characteristic of DMC catalysts is their pronounced sensitivity to high concentrations of hydroxyl groups, which can be caused, for example, by large amounts of starter compounds such as ethylene glycol, propylene glycol, glycerol, trimethylolpropane, sorbitol or sucrose, and polar impurities of the reaction mixture. The DMC catalysts then cannot be converted into the polymerization-active form during the reaction initiation phase. Impurities can be, for example, water, compounds having a high number of hydroxyl groups in close proximity, such as carbohydrates and carbohydrate derivatives, or compounds having basic groups, such as, for example, amines. Substances having carbonyl groups in close proximity or carbonyl groups adjacent to hydroxyl groups also have an adverse effect on the catalyst activity. In order, nevertheless, to be able to subject starter compounds having high concentrations of OH groups or starter compounds with impurities which are to be regarded as catalyst poisons to DMC-catalyzed alkylene oxide addition reactions, the concentration of hydroxyl groups must be lowered or the catalyst poisons rendered harmless. For this purpose, in the past prepolymers were first prepared from these starter compounds by means of base catalysis, and, after thorough working up, it was then possible to convert these into the desired alkylene oxide addition products of high molar mass by means of DMC catalysis. An important further development in this connection was the development of continuous metering of starter compounds, which is disclosed in WO 97/29146. In this case critical starter compounds are not initially introduced into the reactor, but are fed to the reactor continuously during the reaction, alongside the alkylene oxides. In this process, prepolymers can be initially introduced into the reactor as the starting medium for the reaction, and the use of small amounts of the product to be prepared itself as the starting medium is also possible. The necessity of having first to prepare prepolymers suitable for further alkylene oxide additions separately was eliminated with the latter procedure.

However, if short-chain polyether alcohols having OH numbers of greater than 200 mg KOH/g are to be obtained, it is necessary to increase the ratio of starter compound to alkylene oxide in the educt stream metered in, so that there is again the danger of reaching critical concentrations of hydroxyl groups and polar impurities. In such cases the catalysts increasingly lose activity during the starter compound metering phase, which manifests itself e.g. by an increase in pressure in the reactor as a consequence of an increasing concentration of free alkylene oxide.

If compounds of varying purity, for example those which are obtained from renewable sources of raw materials, are employed as starter compounds, unknown secondary components can likewise significantly impair the catalyst activity. In this case either the catalyst cannot be converted into the active form at all, or the loss in activity described above is observed.

The problems described on the one hand, can of course be counteracted by an increase in the catalyst concentration, and on the other hand an attempt can also be made to free the starter compounds from impurities by suitable pretreatments, such as intensive stripping at temperatures above 80° C., distillation or extraction. All these alternatives are time-consuming and cost-intensive.

SUMMARY OF THE INVENTION

The present invention therefore, provides a process for the treatment of DMC catalysts which allows high ratios of starter compound to alkylene oxide to be metered in the continuous starter compound metering process and thus allows polyether polyols having OH numbers of greater than 200 mg KOH/g to be rendered accessible without problems, i.e. without involved pretreatment of the starting medium which has been initially introduced into the reactor or of the starter compounds metered in. Furthermore, the process makes the catalysts robust against any type of impurities which impede conversion of the catalyst into the polymerization-active form. Such impurities can occur, for example, in starter compounds which are obtained from renewable sources of raw materials.

DETAILED DESCRIPTION OF THE INVENTION

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about." Equivalent weights and molecular weights given herein in Daltons (Da) are number average equivalent weights and number average molecular weights respectively, unless indicated otherwise.

The present invention provides a process for conditioning of double metal cyanide (DMC) catalysts in which these are dispersed at temperatures of from 0 to 80° C., preferably from 20 to 60° C., in a precursor which is used as the starting medium for the alkoxylation reaction and has an OH number of from 5 to 500 mg KOH/g or a polyether polyol which corresponds to the reaction product to be prepared, over a period of from 5 min to 4 hours, preferably from 15 min to 2 hours, under an inert gas atmosphere under pressures of from 1 mbar to 10 bar. During this pretreatment, herein referred to as "conditioning", alkylene oxides, such as e.g. propylene oxide and/or ethylene oxide, may be present. If the conditioning is carried out in the presence of alkylene oxides, the actual activation of the catalyst, which manifests itself by an accelerated drop in pressure in the reactor, does not yet start in the conditioning phase.

The present invention also provides a process for the preparation of polyether polyols, in which the catalysts conditioned according to the invention are employed, and the use of the polyether polyols prepared in this way for the preparation of polyurethane materials.

The polyether polyols prepared with the conditioned catalysts have OH numbers of from 5 to 500 mg KOH/g. The catalyst concentration in the end product is conventionally 10 to 1,000 ppm. The conditioned DMC catalysts are distinguished by a high catalyst activity, which is maintained over the entire duration of the reaction. While the process according to the invention is carried out, the partial pressure generated by unreacted alkylene oxide, which is an indicator of the catalyst activity, is significantly lower than when processes of the current prior art are used, with otherwise the same process parameters. A significant increase in process reliability is thus also achieved in this manner.

The process according to the invention is carried out in detail as follows: Small amounts of a precursor having an OH number of from 5 to 500 mg KOH/g are initially introduced as the starting medium into the reactor under an inert gas atmosphere, for example nitrogen or noble gas. The amount of precursor which is advantageously employed as the starting medium depends on the particular reactor and stirrer geometry and the design of the heating and cooling device. It is to be chosen such that the reaction mixture can be readily stirred, and moreover the heat of reaction should be easy to remove or the contents of the reactor should be easy to heat up. The most diverse compounds having OH number of from 5 to 500 mg KOH/g can be employed as precursors. Preferred precursors are e.g. addition products of low molecular weight starter compounds having Zerewitinoff-active hydrogen atoms and alkylene oxides, polyester polyols or polycarbonate polyols and hydroxylated triglycerides or hydroxylated fatty acid derivatives. If the process is to be carried out by the continuous starter compound metering process, a small amount of a previously prepared batch of the product to be prepared itself is often used as the starting medium. Since the catalyst conditioning process according to the invention is carried out in the temperature range from 0 to 80° C., it may be appropriate to free the starting medium from traces of water before the addition of the catalyst, such as for example by stripping with nitrogen or inert gases at temperatures of higher than 80° C. The upper temperature of the temperature range suitable for this process is limited only by the thermal stability of the starting medium.

An inert organic solvent, such as toluene and/or THF, can moreover be added, for example to lower the viscosity of the starting medium. The amount of solvent in such cases is conventionally 10 wt. % to 30 wt. %, based on the total amount of the batch. The process is preferably carried out without a solvent. The DMC catalyst is added to the starting medium. Its concentration, calculated with respect to the amount of end product, is 10 to 1,000 ppm. A small amount of alkylene oxide, up to 20 wt. %, based on the amount of starting medium employed, can now also already be added to the catalyst-containing starting medium, which has advantageously been dried by stripping with inert gases at 0 to 80° C.

The conditioning of the catalyst is preferably carried out at a temperature of from 0° C. to 80° C., preferably from 20° C. to 60° C., by dispersing the catalyst in the starting medium for 5 min to 4 hours, preferably 15 min to 2 hours. The dispersing is preferably carried out by stirring the catalyst-containing starting medium. The stirrer speed is preferably 40 to 800 rpm. Further possibilities are pumping of the catalyst-containing starting mixture in circulation, the use of static mixers or jet dispersing devices, or dispersion by means of ultrasound. If no readily volatile alkylene oxides have yet been metered in, the starting medium can also be freed from low molecular weight impurities, such as e.g. water, by evacuation and/or stripping with inert gases within the conditioning time. Stripping or evacuation is preferably carried out for 15 to 60 min.

The catalyst is now activated by heating to temperatures of from 80 to 160° C., preferably 100 to 140° C., very particularly preferably 120 to 140° C. For this procedure, if this has not already happened in the conditioning phase, 5 to 20 wt. % of alkylene oxide, based on the amount of starting medium, is introduced into the reactor. The alkylene oxide can be added before, during or after the heating up of the contents of the reactor to the activation temperature. The activation of the catalyst manifests itself by an accelerated drop in the reactor pressure, by which the start of the alkylene oxide conversion is indicated. The desired amount of alkylene oxide or alkylene oxide mixtures can then be fed continuously to the reaction mixture, a reaction temperature of from 20 to 200° C., but preferably from 50 to 160° C. being chosen. The activation temperature is very particularly preferably chosen as the reaction temperature. If a further starter compound or a further starter compound mixture is to be fed to the reactor by the continuous starter compound metering process, its metering can be started when 10 to 60 wt. % of alkylene oxide or alkylene oxide mixture, based on the amount of starting medium, has already been added to the starting medium. The metering rate for further starter compounds or starter compound mixtures is preferably chosen such that after the end of the metering of the starter compound (mixture) a small amount of further alkylene oxide (mixture) can still be metered in to achieve the desired OH number. However, it is also possible to allow the metering of the starter compound (mixture) and the metering of the alkylene oxide (mixture) to end simultaneously.

In one variant of the preparation of polyether polyols, the total amount of the starter compounds employed for the preparation of the polyether polyols is already present in the starting medium during the conditioning of the DMC catalysts. Only alkylene oxide (mixture) is then still metered in continuously after activation of the catalyst.

After the end of the metering of the alkylene oxide (mixture), an after-reaction phase follows, in which the decrease in the concentration of unreacted alkylene oxide is preferably quantified by monitoring the pressure. When a constant pressure is reached, the product can be discharged from the reactor, optionally after a thorough heating phase.

A process for the fully continuous preparation of polyether polyols such as is described in WO 98/03571 is also an important process alternative. In this process, catalyst must also be fed continuously to a reactor, alongside alkylene oxide and starter mixture. For this purpose, a concentrated dispersion containing 0.1 to 10 wt. % of conditioned catalyst is prepared by the catalyst conditioning process described above in the absence of alkylene oxides, and is then fed to the reactor in the fully continuous polyether polyol preparation process. DMC catalysts which are suitable for the process according to the invention are known in principle. As already mentioned, DMC catalysts are used above all for the preparation of polyether polyols by polyaddition of alkylene oxide on to starter compounds having active hydrogen atoms (see e.g. U.S. Pat. No. 3,404,109, U.S. Pat. No. 3,829,505, U.S. Pat. No. 3,941,849 and U.S. Pat. No. 5,158,922), since the use of DMC catalysts has the effect of a reduction in the content of monofunctional polyethers having terminal double bonds, so-called mono-ols, compared with the conventional preparation of polyether polyols by means of alkali catalysts. Moreover, base-sensitive functional groups, such as, for example, carbonyl functions or ester groups, withstand DMC-catalyzed alkylene oxide addition reactions intact. Improved DMC catalysts, which are described e.g. in U.S. Pat. No. 5,470,813, EP-A 700 949, EP-A 743 093, EP-A 761 708, WO 97/40086, WO 98/16310 and WO 00/47649, furthermore have, as already mentioned in the introductory sections, an exceptionally high activity and render possible preparation of polyether polyols at very low catalyst concentrations (25 ppm or less), so that it is no longer necessary to separate off the catalyst from the finished product. Examples include the highly active DMC catalysts described in EP-A 700 949, which also contain a polyether having a number-average molecular weight of greater than 500 g/mol, alongside a double metal cyanide compound (e.g. zinc hexacyanocobaltate(III)) and an organic complexing ligand (e.g. tert-butanol).

Suitable alkylene oxides are, for example, ethylene oxide, propylene oxide, 1,2- and 2,3-butylene oxide and styrene oxide. Propylene oxide and ethylene oxide are preferably used, individually or as mixtures. If various alkylene oxides are used, these can be metered in either as a mixture or successively. In the case of the latter metering method, the polyether chains have block structures. To obtain defined block structures in the process according to the invention, however, it is necessary to end the continuous metering of starter compounds together with or shortly before the end of the metering of the first alkylene oxide block. Preferably, pure ethylene oxide or mixtures of propylene oxide and ethylene oxide having a high ethylene oxide content are metered in as the end block, so that the polyether polyols prepared contain 40 to 100% of primary OH end group.

Further monomers which can be copolymerized with alkylene oxide by this process are, for example, lactones, lactides, acid anhydrides, cyclic carbonates and carbon dioxide. Their use is described in U.S. Pat. No. 3,538,043, U.S. Pat. No. 4,500,704, U.S. Pat. No. 5,032,671 and U.S. Pat. No. 6,646,100.

Suitable starter compounds for the continuous starter compound metering process using DMC catalysts conditioned according to the invention preferably have functionalities of from 2 to 8. Examples are propylene glycol, ethylene glycol, diethylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, triethanolamine, pentaerythritol, sorbitol, sucrose, hydroquinone, pyrocatechol, resorcinol, bisphenol F, bisphenol A, 1,3,5-trihydroxybenzene, condensates of formaldehyde and phenol or melamine or urea containing methylol groups, and Mannich bases. Mono- or polyamines which can optionally be employed are ethylenediamine, 1,3-diaminopropane, 1,4-diaminobutane, hexamethylenediamine, ethanolamine, diethanolamine, diethylenetriamine, aniline, piperazine, the isomers of toluenediamine and the isomers of (diaminodiphenyl)methane. Starter compounds which are free from amino groups are preferably used.

Polyester polyols are also suitable as starter compounds which are to be metered in continuously or starting media which are to be initially introduced into the reaction vessel. These can be prepared, for example, from organic dicarboxylic acids having 2 to 12 carbon atoms and polyhydric alcohols, preferably diols, having 2 to 12 carbon atoms, preferably 2 to 6 carbon atoms. Possible dicarboxylic acids are, for example: succinic acid, glutaric acid, adipic acid, suberic acid, azelaic acid, sebacic acid, decanedicarboxylic acid, dodecanedicarboxylic acid, maleic acid, fumaric acid, phthalic acid, isophthalic acid and terephthalic acid. In this context, the dicarboxylic acids can be used either individually or in a mixture with one another. Instead of the free dicarboxylic acids, it is also possible to employ the corresponding dicarboxylic acid derivatives, such as e.g. dicarboxylic acid mono- and/or diesters of alcohols having 1 to 4 carbon atoms or dicarboxylic acid anhydrides. Dicarboxylic acid mixtures of succinic, glutaric and adipic acid in ratios of amounts of, for example, 20-35/40-60/20-36 parts by wt., and in particular adipic acid are preferably used. Examples of di- and polyhydric alcohols are ethanediol, diethylene glycol, 1,2- and 1,3-propanediol, dipropylene glycol, methyl-1,3-propanediol, 1,4-butanediol, 1,5-pentanediol, 3-methyl-1,5-pentanediol, 1,6-hexanediol, neopentylglycol, 1,10-decanediol, 1,12-dodecanediol, glycerol, trimethylolpropane and pentaerythritol. 1,2-Ethanediol, diethylene glycol, 1,4-butanediol, 1,6-hexanediol, glycerol, trimethylolpropane or mixtures of at least two of the diols mentioned, in particular mixtures of ethanediol, 1,4-butanediol and 1,6-hexanediol, glycerol and/or trimethylolpropane, are preferably used. Polyester polyols from lactones, e.g. ε-caprolactone, or hydroxycarboxylic acids, e.g. hydroxycaproic acid and hydroxyacetic acid, can furthermore be employed.

For preparation of such polyester polyols, the organic, aromatic or aliphatic polycarboxylic acids and/or polycarboxylic acid derivatives and polyhydric alcohols can be subjected to polycondensation without a catalyst or in the presence of esterification catalysts, expediently in an atmosphere of inert gases, such as e.g. nitrogen, helium or argon, and also in the melt at temperatures of from 150 to 300° C., preferably 180 to 230° C., optionally under reduced pressure, until the desired acid and OH numbers are reached. The acid number is preferably less than 10 mg KOH/g, preferably less than 2.5 mg KOH/g.

In a preferred preparation process, the esterification mixture is subjected to polycondensation at the abovementioned temperatures under normal pressure and then under a pressure of less than 500 mbar, preferably 1 to 150 mbar, to an acid number of from 80 to 30, preferably 40 to 30. Possible esterification catalysts are, for example, iron, cadmium, cobalt, lead, zinc, antimony, magnesium, titanium and tin catalysts in the form of metals, metal oxides or metal salts. However, the polycondensation of aromatic or aliphatic carboxylic acids with polyhydric alcohols can also be carried out in a liquid phase in the presence of diluents and/or entraining agents, such as e.g. benzene, toluene, xylene or chlorobenzene, for removal of the water of condensation by azeotropic distillation.

The ratio of dicarboxylic acid (derivative) and polyhydric alcohol to be chosen to obtain a desired OH number, functionality and viscosity and the alcohol functionality to be chosen can be determined in a simple manner by the person skilled in the art.

Polycarbonates containing hydroxyl groups are furthermore suitable as starter compounds which are to be metered in continuously or starting media which are to be initially introduced into the reaction vessel. Possible polycarbonates containing hydroxyl groups are those of the type known per se, which can be prepared e.g. by reaction of diols, such as 1,2-propanediol, 1,4-butanediol, 1,6-hexanediol, diethylene glycol, triethylene glycol, tetraethylene glycol oligo-tetramethylene glycol and/or oligo-hexamethylene glycol, with diaryl carbonates and/or dialkyl carbonates, e.g. diphenyl carbonate, dimethyl carbonate and α-ω-bischloroformates or phosgene.

Against the background of the scarcity of petrochemical resources and the adverse rating of fossil raw materials in ecobalances, the use of raw materials from regenerable sources is also gaining increasing importance in the preparation of polyols which are suitable for the polyurethane industry. One possibility for the preparation of such polyols is the addition of alkylene oxides on to hydroxylated triglycerides, such as, for example, hydroxylated soya oil or hydroxylated rapeseed oil. Such starter compounds can be reacted with alkylene oxides particularly advantageously by the process according to the invention. Other fatty acid derivatives, such as, for example, fatty acid monoalkyl esters, can of course also be hydroxylated and employed in the process according to the invention. The hydroxylated triglycerides and/or hydroxylated fatty acid derivatives can be either initially introduced into the reaction vessel as the starting medium, or fed to the reactor continuously as starter compounds during the alkylene oxide metering phase.

All the starter compounds or starting media can be employed individually or as mixtures. Small amounts (1 to 500 ppm) of organic or inorganic acids can moreover be added to the starter compounds and/or the starting medium, as described in WO 99/14258.

An essential feature of the present invention is the reduced sensitivity of the DMC catalyst to many types of impurities in the starter compound (mixture) or in the starting medium which can be achieved by the conditioning. Involved purification operations on the starter compound (mixture) or the starting medium can thus be reduced to a minimum in many cases, or avoided entirely. For example, the DMC catalyst does not react particularly sensitively to water in the starter compound (mixture) even at high ratios of starter compound (mixture) to alkylene oxide in the educt stream metered in; the consistently high catalyst activity even at relatively low amounts of catalyst manifests itself in low alkylene oxide partial pressures during the reaction.

Anti-ageing agents, such as e.g. antioxidants, can optionally be added to the polyols obtainable by the process according to the invention.

The polyols can be reacted, by themselves or optionally in a mixture with further isocyanate-reactive components, with organic polyisocyanates, optionally in the presence of blowing agents, in the presence of catalysts and optionally with further additives, such as e.g. cell stabilizers, and in this way serve as components of solid or foamed polyurethane materials.

EXAMPLES

Raw Materials Employed

Catalyst for the Alkylene Oxide Addition (DMC Catalyst):

Double metal cyanide catalyst made from zinc hexacyanocobaltate, tert-butanol and polypropylene glycol having a number-average molecular weight of 1,000 g/mol; as described in EP-A 700 949.

Polyol A

Trifunctional polyether of OH number 238, obtained by addition of propylene oxide on to glycerol.

Polyol B

Difunctional polyether of OH number 260, obtained by addition of propylene oxide on to propylene glycol.

Polyol C

Trifunctional polyether of OH number 56, obtained by addition of propylene oxide on to glycerol. Polyol C contained 200 ppm phosphoric acid.

Preparation of Hydroxylated Rapeseed Oil (Polyol D):

3,050 g rapeseed oil obtained from 00-rapeseed (erucic acid content: 0.3 wt. %, content of free fatty acids: 0.6 wt. %, iodine number: 117 g iodine/100 g, obtained from Campa Biodiesel, Ochsenfurt, Germany) were initially introduced into a glass flask under a nitrogen atmosphere and were heated to 70° C. 370.4 g formic acid and 457.7 g hydrogen peroxide (as a 50% strength solution in water) in each case in 7 equal portions were now added via two dropping funnels over a period of 7 hours. The particular hydrogen peroxide portion was metered directly after a formic acid portion. After addition of the last portion, the reaction mixture was left to after-react for 1 hour at 70° C. and was then heated for 4 hours at the reflux temperature (105° C.). The oxirane oxygen content was 0.051 wt. %. After the water and unreacted formic acid had been distilled off, the product was heated thoroughly for 3 hours at 110° C. under a pressure of 1 mbar. The OH number of the hydroxylated rapeseed oil was 149.8 mg KOH/g, and its acid number was 5.63 mg KOH/g.

Example 1

0.39 g DMC catalyst was added to 750 g polyol A in a 10-liter autoclave. The contents of the reactor were then heated up to 60° C. and stripped for 30 min, while stirring (450 rpm) and while passing through nitrogen (50 ml/min). The contents of the reactor were then stirred at 60° C. under 100 mbar for a further 60 min. Thereafter, the mixture was heated to 130° C. and 80 g propylene oxide were added to the reactor with a metering rate of 200 g/hr, the pressure rising to 1.2 bar. The subsequent activation of the DMC catalyst manifested itself by an accelerated drop in pressure. After activation of the catalyst had taken place, a further 4,484.8 g propylene oxide were metered into the autoclave with a constant 1,087 g/hr. After a total of 100 g propylene oxide (including the amount employed for activation of the catalyst) had been metered, metering of 46 g propylene glycol (containing 750 ppm water) was started with a constant metering rate of 22.75 g/hr. After a total of 250 g propylene oxide (including the amount employed for activation of the catalyst) had been metered, metering of 639.3 g glycerol (containing 2,000 ppm water and 75 ppm phosphoric acid) was started with a constant metering rate of 177.5 g/hr. After the end of the metering in of propylene oxide, the mixture was left to after-react for a further 23 min at 130° C., and the product was heated thoroughly at 130° C. in vacuo for 30 min. The maximum propylene oxide partial pressure, determined from the difference between the maximum reactor pressure and the pressure level reached at the end of the after-reaction phase, was 1.4 bar. The OH number of the product was 235.3 mg KOH/g.

Example 2

0.39 g DMC catalyst was added to 750.9 g polyol A in a 10-liter autoclave. The contents of the reactor were then heated up to 60° C. and stripped for 30 min, while stirring (450 rpm) and while passing through nitrogen (50 ml/min). The contents of the reactor were then stirred at 60° C. under 100 mbar for a further 30 min. Thereafter, the mixture was heated to 130° C. and 80 g propylene oxide were added to the reactor with a metering rate of 250 g/hr, the pressure rising to 1.2 bar. The subsequent activation of the DMC catalyst manifested itself by an accelerated drop in pressure. After activation of the catalyst had taken place, a further 4,484.9 g propylene oxide were metered into the autoclave with a constant 1,087 g/hr. After a total of 100 g propylene oxide (including the amount employed for activation of the catalyst) had been metered, metering of 46 g propylene glycol (containing 750 ppm water) was started with a constant metering rate of 22.75 g/hr. After a total of 250 g propylene oxide (including the amount employed for activation of the catalyst) had been metered, metering of 639.6 g glycerol (containing 2,000 ppm water and 75 ppm phosphoric acid) was started with a constant metering rate of 177.5 g/hr. After the end of the metering in of propylene oxide, the mixture was left to after-react for a further 1 hour at 130° C., and the product was heated thoroughly at 130° C. in vacuo for 30 min. The maximum propylene oxide partial pressure, determined from the difference between the maximum reactor pressure and the pressure level reached at the end of the after-reaction phase, was 1.65 bar. The OH number of the product was 234.9 mg KOH/g.

Example 3

0.39 g DMC catalyst was added to 751 g polyol A in a 10-liter autoclave. The contents of the reactor were then heated up to 60° C. and stripped for 30 min, while stirring (450 rpm) and while passing through nitrogen (50 ml/min). Thereafter, the mixture was heated to 130° C. and 80 g propylene oxide were added to the reactor with a metering rate of 250 g/hr, the pressure rising to 0.8 bar. The subsequent activation of the DMC catalyst manifested itself by an accelerated drop in pressure. After activation of the catalyst had taken place, a further 4,484.9 g propylene oxide were metered into the autoclave with a constant 1,087 g/hr. After a total of 100 g propylene oxide (including the amount employed for activation of the catalyst) had been metered, metering of 46 g propylene glycol (containing 750 ppm water) was started with a constant metering rate of 22.75 g/hr. After a total of 250 g propylene oxide (including the amount employed for activation of the catalyst) had been metered, metering of 640 g glycerol (containing 2,000 ppm water and 75 ppm phosphoric acid) was started with a constant metering rate of 177.5 g/hr. After the end of the metering in of propylene oxide, the mixture was left to after-react for a further 30 min at 130° C., and the product was heated thoroughly at 130° C. in vacuo for 30 min. The maximum propylene oxide partial pressure, determined from the difference between the maximum reactor pressure and the pressure level reached at the end of the after-reaction phase, was 1.65 bar. The OH number of the product was 235.7 mg KOH/g.

Example 4

0.39 g DMC catalyst was added to 752.9 g polyol A in a 10-liter autoclave. The contents of the reactor were then stripped at 20° C., while stirring (450 rpm) and while passing through nitrogen (50 ml/min). The contents of the reactor were then stirred at 20° C. under 100 mbar for a further 3 hours. Thereafter, the mixture was heated to 130° C. and 80 g propylene oxide were added to the reactor with a metering rate of 250 g/hr, the pressure rising to 1.4 bar. The subsequent activation of the DMC catalyst manifested itself by an accelerated drop in pressure. After activation of the catalyst had taken place, a further 4,484.9 g propylene oxide were metered into the autoclave with a constant 1,087 g/hr. After a total of 100 g propylene oxide (including the amount employed for activation of the catalyst) had been metered, metering of 46 g propylene glycol (containing 750 ppm water) was started with a constant metering rate of 22.75 g/hr. After a total of 250 g propylene oxide (including the amount employed for activation of the catalyst) had been metered, metering of 640 g glycerol (containing 2,000 ppm water and 75 ppm phosphoric acid) was started with a constant metering rate of 177.5 g/h. After the end of the metering in of propylene oxide, the mixture was left to after-react for a further 40 min at 130° C., and the product was heated thoroughly at 130° C. in vacuo for 30 min. The maximum propylene oxide partial pressure, determined from the difference between the maximum reactor pressure and the pressure level reached at the end of the after-reaction phase, was 0.95 bar. The OH number of the product was 236.0 mg KOH/g.

Example 5

0.39 g DMC catalyst was added to 754 g polyol A in a 10-liter autoclave. The contents of the reactor were then stripped at 20° C. for 30 min, while stirring (450 rpm) and while passing through nitrogen (50 ml/min). The contents of the reactor were then stirred at 20° C. under 100 mbar for a further 114 min. Thereafter, the mixture was heated to 130° C. and 80 g propylene oxide were added to the reactor with a metering rate of 250 g/hr, the pressure rising to 1.7 bar. The subsequent activation of the DMC catalyst manifested itself by an accelerated drop in pressure. After activation of the catalyst had taken place, a further 4,484.9 g propylene oxide were metered into the autoclave with a constant 1,087 g/hr. After a total of 100 g propylene oxide (including the amount employed for activation of the catalyst) had been metered, metering of 46.2 g propylene glycol (containing 750 ppm water) was started with a constant metering rate of 22.75 g/hr. After a total of 250 g propylene oxide (including the amount employed for activation of the catalyst) had been metered, metering of 639.9 g glycerol (containing 2,000 ppm water and 75 ppm phosphoric acid) was started with a constant metering rate of 177.5 g/hr. After the end of the metering in of propylene oxide, the mixture was left to after-react for a further 33 min at 130° C., and the product was heated thoroughly at 130° C. in vacuo for 30 min. The maximum propylene oxide partial pressure, determined from the difference between the maximum reactor pressure and the pressure level reached at the end of the after-reaction phase, was 1.1 bar. The OH number of the product was 235.2 mg KOH/g.

Example 6 (Comparison)

0.39 g DMC catalyst was added to 750.3 g polyol A in a 10-liter autoclave. The contents of the reactor were then stripped at 130° C. for 30 min, while stirring (450 rpm) and while passing through nitrogen (50 ml/min). 80 g propylene oxide were then added to the reactor at 130° C. with a metering rate of 250 g/hr. The catalyst already activated after metering of 30 g propylene oxide (maximum pressure reached: 0.5 bar), which manifested itself by an accelerated drop in pressure. After activation of the catalyst had taken place, a further 4,484.5 g propylene oxide were metered into the autoclave with a constant 1,087 g/hr. After a total of 100 g propylene oxide (including the amount employed for activation of the catalyst) had been metered, metering of 46 g propylene glycol (containing 750 ppm water) was started with a constant metering rate of 22.75 g/hr. After a total of 250 g propylene oxide (including the amount employed for activation of the catalyst) had been metered, metering of 639.4 g glycerol (containing 2,000 ppm water and 75 ppm phosphoric acid) was started with a constant metering rate of 177.5 g/hr. After the end of the metering in of propylene oxide, the mixture was left to after-react for a further 30 min at 130° C., and the product was heated thoroughly at 130° C. in vacuo for 30 min. The maximum propylene oxide partial pressure, determined from the difference between the maximum reactor pressure and the pressure level reached at the end of the after-reaction phase, was 3.03 bar. The OH number of the product was 235.6 mg KOH/g.

Example 7

0.39 g DMC catalyst was added to 750.6 g polyol A in a 10-liter autoclave. The contents of the reactor were then stripped at 60° C. for 30 min, while stirring (450 rpm) and while passing through nitrogen (50 ml/min). 80 g propylene oxide were then added to the reactor at 60° C. with a metering rate of 250 g/hr. The pressure rose to 0.7 bar during this operation. The contents of the reactor were than stirred under this pressure at 60° C. for a further 90 min. Thereafter, the mixture was heated to 130° C., the pressure rising to 2.15 bar. The subsequent activation of the DMC catalyst manifested itself by an accelerated drop in pressure. After activation of the catalyst had taken place, a further 4,484.9 g propylene oxide were metered into the autoclave at a constant 1,087 g/hr. After a total of 100 g propylene oxide (including the amount employed for activation of the catalyst) had been metered, metering of 46 g propylene glycol (containing 750 ppm water) was started with a constant metering rate of 22.75 g/hr. After a total of 250 g propylene oxide (including the amount employed for activation of the catalyst) had been metered, metering of 639.3 g glycerol (containing 2,000 ppm water and 75 ppm phosphoric acid) was started with a constant metering rate of 177.5 g/hr. After the end of the metering in of propylene oxide, the mixture was left to after-react for a further 24 min at 130° C., and the product was heated thoroughly at 130° C. in vacuo for 30 min. The maximum propylene oxide partial pressure, determined from the difference between the maximum reactor pressure and the pressure level reached at the end of the after-reaction phase, was 1.15 bar. The OH number of the product was 236.2 mg KOH/g.

Example 8 (Comparison)

0.541 g DMC catalyst was added to 749.8 g polyol A in a 10-liter autoclave. The contents of the reactor were then stripped at 130° C. for 30 min, while stirring (450 rpm) and while passing through nitrogen (50 ml/min). 80 g propylene oxide were then added to the reactor at 130° C. with a metering rate of 250 g/hr. The catalyst already activated after metering of 35 g propylene oxide (maximum pressure reached: 0.65 bar), which manifested itself by an accelerated drop in pressure. After activation of the catalyst had taken place, a further 4,484.8 g propylene oxide were metered into the autoclave with a constant 1,087 g/hr. After a total of 100 g propylene oxide (including the amount employed for activation of the catalyst) had been metered, metering of 46.2 g propylene glycol (containing 750 ppm water) was started with a constant metering rate of 22.75 g/hr. After a total of 250 g propylene oxide (including the amount employed for activation of the catalyst) had been metered, metering of 640.0 g glycerol (containing 1,000 ppm water and 75 ppm phosphoric acid) was started with a constant metering rate of 177.5 g/hr. After the end of the metering in of propylene oxide, the mixture was left to after-react for a further 39 min at 130° C., and the product was heated thoroughly at 130° C. in vacuo for 30 min. The maximum propylene oxide partial pressure, determined from the difference between the maximum reactor pressure and the pressure level reached at the end of the after-reaction phase, was 0.7 bar. The OH number of the product was 235.5 mg KOH/g.

Example 9

0.37 g DMC catalyst was added to 749.9 g polyol A in a 10 l autoclave. The contents of the reactor were then stripped at 20° C. for 15 min, while stirring (450 rpm) and while passing through nitrogen (50 ml/min). Thereafter, the mixture was heated to 130° C. and 80 g propylene oxide were added to the reactor at a metering rate of 250 g/h, the pressure rising to 2.2 bar. The subsequent activation of the DMC catalyst manifested itself by an accelerated drop in pressure. After activation of the catalyst had taken place, a further 4484.8 g propylene oxide were metered into the autoclave at a constant metering rate of 1087 g/h. After a total of 100 g propylene oxide (including the amount employed for activation of the catalyst) had been metered in, the metering in of 46.0 g propylene glycol (containing 750 ppm water) was started at a constant metering rate of 22.75 g/h. After a total of 250 g propylene oxide (including the amount employed for activation of the catalyst) had been metered in, the metering in of 639.3 g glycerol (containing 2,000 ppm water and 75 ppm phosphoric acid) was started at a constant metering rate of 177.5 g/h. After the end of the metering in of propylene oxide, the mixture was left to after-react for a further 30 min at 130° C., and the product was finally heated thoroughly at 130° C. in vacuo for 30 min. The maximum propylene oxide partial pressure, determined from the difference between the maximum reactor pressure and the pressure level reached at the end of the after-reaction phase, was 1.12 bar. The OH number of the product was 238.2 mg KOH/g.

Example 10

0.36 g DMC catalyst was added to 750.1 g of the product from Example 9 in a 10 l autoclave. The contents of the reactor were then stripped at 20° C. for 15 min, while stirring (450 rpm) and while passing through nitrogen (50 ml/min). Thereafter, the mixture was heated to 130° C. and 80 g propylene oxide were added to the reactor at a metering rate of 250 g/h, the pressure rising to 2.0 bar. The subsequent activation of the DMC catalyst manifested itself by an accelerated drop in pressure. After activation of the catalyst had taken place, a further 4484.9 g propylene oxide were metered into the autoclave at a constant metering rate of 1087 g/h. After a total of 100 g propylene oxide (including the amount employed for activation of the catalyst) had been metered in, the metering in of 46.1 g propylene glycol (containing 750 ppm water) was started at a constant metering rate of 22.75 g/h. After a total of 250 g propylene oxide (including the amount employed for activation of the catalyst) had been metered in, the metering in of 639.3 g glycerol (containing 2,000 ppm water and 75 ppm phosphoric acid) was started at a constant metering rate of 177.5 g/h. After the end of the metering in of propylene oxide, the mixture was left to after-react for a further 40 min at 130° C., and the product was finally heated thoroughly at 130° C. in vacuo for 30 min. The maximum propylene oxide partial pressure, determined from the difference between the maximum reactor pressure and the pressure level reached at the end of the after-reaction phase, was 1.12 bar. The OH number of the product was 235.1 mg KOH/g.

The test parameters and the test results of Examples 1 to 10 are summarized below in Table I.

TABLE I

| Example | Conditioning Temp. [° C.] | Conditioning Time [min] | Catalyst conc. [ppm] | Water in glycerol [ppm] | OH # [mg KOH/g] | Max. PO partial press. [bar] |
|---|---|---|---|---|---|---|
| 1 | yes 60 | 90 | 65 | 2,000 | 235.3 | 1.4 |
| 2 | yes 60 | 60 | 65 | 2,000 | 234.9 | 1.65 |
| 3 | yes 60 | 30 | 65 | 2,000 | 235.7 | 1.65 |
| 4 | yes 20 | 210 | 65 | 2,000 | 236.0 | 0.95 |
| 5 | yes 20 | 144 | 65 | 2,000 | 235.2 | 1.10 |
| C-6 | no — | — | 65 | 2,000 | 235.6 | 3.03 |
| 7* | yes 60 | 120 | 65 | 2,000 | 236.2 | 1.15 |
| C-8 | no — | — | 90 | 1,000 | 235.5 | 0.70 |
| 9 | yes 20 | 15 | 62 | 2,000 | 238.2 | 1.12 |
| 10 | yes 20 | 15 | 68 | 2,000 | 235.1 | 1.12 |

*In this example, propylene oxide was already added to the reactor during the conditioning phase.

Catalyst concentration in Table I above is given with respect to the end product.

Comparison Example 8 shows that by increasing the amount of catalyst and drying the glycerol, a smooth course of reaction, detectable from the relatively low propylene oxide partial pressure, can also be achieved without using the conditioning process. Such a process is of course not desirable because of the prior purification operation and the high amount of catalyst to be employed.

Example 11

0.24 g DMC catalyst was added to 300 g polyol C in a 10-liter autoclave. The contents of the reactor were then stripped at 60° C. for 30 min, while stirring (450 rpm) and while passing through nitrogen (50 ml/min). Thereafter, the contents of the reactor were stirred for a further 90 min at 60° C. under 100 mbar. Thereafter, the mixture was heated to 130° C. and a mixture of 3.3 g ethylene oxide and 27.7 g propylene oxide was metered in. The pressure rose to 1.6 bar during this operation. The subsequent activation of the DMC catalyst manifested itself by an accelerated drop in pressure. When the activation of the catalyst had taken place, a mixture of 127.4 g ethylene oxide and 1,042.4 g propylene oxide was metered into the autoclave with a constant metering rate of 601.1 g/hr. After a total of 100 g alkylene oxide mixture (including the amount employed for activation of the catalyst) had been metered, metering of 897.7 g polyol D was started with a constant metering rate of 600 g/hr. When the metering in of the alkylene oxide mixture had ended, the mixture was left to after-react for a further 45 min at 130° C., and the product was heated thoroughly at 130° C. in vacuo for 30 min. The maximum alkylene oxide partial pressure, determined from the difference between the maximum reactor pressure and the pressure level reached at the end of the after-reaction phase, was 1.02 bar. The OH number of the product was 63.1 mg KOH/g.

Example 12 (Comparison)

0.25 g DMC catalyst was added to 300 g polyol C in a 10-liter autoclave. The contents of the reactor were then stripped at 130° C. for 30 min, while stirring (450 rpm) and while passing through nitrogen (50 ml/min). A mixture of 3.3 g ethylene oxide and 27.7 g propylene oxide was then metered in. The pressure rose to 1.5 bar during this operation. The subsequent activation of the DMC catalyst manifested itself by an accelerated drop in pressure. When the activation of the catalyst had taken place, a mixture of 127.4 g ethylene oxide and 1,042.4 g propylene oxide was metered into the autoclave with a constant metering rate of 601.1 g/hr. After the metering of 897.7 g polyol D at a constant metering rate of 600 g/hr had been started after a total of 100 g alkylene oxide mixture (including the amount employed for activation of the catalyst) had been metered, the pressure in the reactor rose rapidly to a value of 4.2 bar. At this pressure level, 40.6 g ethylene oxide and 331.5 g propylene oxide had been metered in at this point in time, the metering of the alkylene oxide mixture was discontinued. During the 3-hour after-reaction phase, the reactor pressure dropped only to 3.5 bar, which indicated a complete deactivation of the catalyst. The experiment was therefore discontinued.

Example 13

0.24 g DMC catalyst was added to 300.6 g of the product from Example 9, containing 100 ppm DMC catalyst from its preparation, in a 10-liter autoclave. The contents of the reactor were then stripped at 60° C. for 30 min, while stirring (450 rpm) and while passing through nitrogen (50 ml/min). Thereafter, the contents of the reactor were stirred for a further 90 min at 60° C. under 100 mbar. Thereafter, the mixture was heated to 130° C. and a mixture of 3.3 g ethylene oxide and 27.7 g propylene oxide was metered in. The pressure rose to 1.3 bar during this operation. The subsequent activation of the DMC catalyst manifested itself by an accelerated drop in pressure. When the activation of the catalyst had taken place, a mixture of 128.9 g ethylene oxide and 1,042.3 g propylene oxide was metered into the autoclave with a constant metering rate of 601.1 g/hr. After a total of 100 g alkylene oxide mixture (including the amount employed for activation of the catalyst) had been metered, metering of 905.8 g polyol D was started with a constant metering rate of 600 g/hr. When the metering in of the alkylene oxide mixture had ended, the mixture was left to after-react for a further 105 min at 130° C., and the product was heated thoroughly at 130° C. in vacuo for 30 min. The maximum alkylene oxide partial pressure, determined from the difference between the maximum reactor pressure and the pressure level reached at the end of the after-reaction phase, was 1.06 bar. The OH number of the product was 63.3 mg KOH/g.

Example 14

0.24 g DMC catalyst was added to 300.8 g polyol C and 898.7 g polyol D in a 10-liter autoclave. The contents of the reactor were then stripped at 60° C. for 30 min, while stirring (450 rpm) and while passing through nitrogen (50 ml/min). Thereafter, the contents of the reactor were stirred for a further 90 min at 60° C. under 100 mbar. The mixture was then heated to 130° C. and a mixture of 20.0 g ethylene oxide and 100.0 g propylene oxide was metered in. The pressure rose to 3 bar during this operation. The subsequent activation of the DMC catalyst manifested itself by an accelerated drop in pressure. When the activation of the catalyst had taken place, a mixture of 112.3 g ethylene oxide and 950.6 g propylene oxide was metered into the autoclave with a constant metering rate of 501 g/hr. When the metering in of the alkylene oxide mixture had ended, the mixture was left to after-react for a further 40 min at 130° C., and the product was heated thoroughly at 130° C. in vacuo for 30 min. The maximum alkylene oxide partial pressure, determined from the difference between the maximum reactor pressure, which in this case was reached shortly before activation of the catalyst, and the pressure level reached at the end of the after-reaction phase, was 2.4 bar. The OH number of the product was 63.2 mg KOH/g.

The test parameters and the test results of Examples 11 to 14 are summarized below in Table II.

TABLE II

| | Conditioning | | Catalyst | | Max. PO |
| Example | | Temp. [° C.] | Time [min] | conc. [ppm] | OH # [mg KOH/g] | partial press. [bar] |
| --- | --- | --- | --- | --- | --- | --- |
| 11 | yes | 60 | 120 | 100 | 63.1 | 1.02 |
| C-12 | no | — | — | 100 | reaction discontinued | reaction discontinued |
| 13 | yes | 60 | 120 | 112 | 63.3 | 1.06 |
| 14* | yes | 60 | 120 | 100 | 63.2 | 2.4 |

*In this example, in contrast to Example 11, all the starter compounds were initially introduced into the reactor before the start of metering of the epoxide.
Catalyst concentration in Table II above is given with respect to the end product.

Example 15

0.41 g DMC catalyst was added to 666.6 g polyol B in a 10-liter autoclave. The contents of the reactor were then heated up to 60° C. and stripped for 30 min, while stirring (450 rpm) and while passing through nitrogen (50 ml/min). 66.6 g propylene oxide were then added to the reactor at 60° C. The pressure rose to 0.6 bar during this procedure. The contents of the reactor were then stirred under this pressure at 60° C. for a further 60 min. Thereafter, the mixture was heated to 130° C., the pressure rising to 1.8 bar. The subsequent activation of the DMC catalyst manifested itself by an accelerated drop in pressure. After activation of the catalyst had taken place, a further 2,435.7 g propylene oxide were metered into the autoclave with a constant 648.3 g/hr. After a total of 150 g propylene oxide (including the amount employed for activation of the catalyst) had been metered, metering of 831.2 g propylene glycol (containing 250 ppm water and 106 ppm phosphoric acid) was started with a constant metering rate of 250 g/hr. After the end of the metering in of propylene oxide, the mixture was left to after-react for a further 40 min at 130° C., and the product was heated thoroughly at 130° C. in vacuo for 30 min. The maximum propylene oxide partial pressure, determined from the difference between the maximum reactor pressure and the pressure level reached at the end of the after-reaction phase, was 1.26 bar. The OH number of the product was 347.7 mg KOH/g.

Example 16 (Comparison)

0.41 g DMC catalyst was added to 666.6 g polyol B in a 10-liter autoclave. The contents of the reactor were then stripped at 130° C. for 30 min, while stirring (450 rpm) and while passing through nitrogen (50 ml/min). 66.6 g propylene oxide were then added to the reactor with a metering rate of 250 g/hr at 60° C. During the metering of this amount of propylene oxide, the pressure rose intermediately to 1.5 bar, and the DMC catalyst already activated in this phase, which manifested itself by an accelerated drop in pressure. It was intended to meter a further 2,436.3 g propylene oxide into the autoclave with a constant metering rate of 648.3 g/hr. After a total of 150 g propylene oxide (including the amount employed for activation of the catalyst) had been metered in, metering of 831.07 g propylene glycol (containing 250 ppm water) was started with a constant metering rate of 250 g/hr. The pressure in the reactor rose rapidly to a value of 1.62 bar. The metering of propylene oxide and propylene glycol was therefore interrupted. After an after-reaction phase of 50 min, the metering of propylene oxide and propylene glycol was started again under a pressure of 0.48 bar with the abovementioned metering rates. The reactor pressure rose significantly more steeply than before to 1.8 bar, after which both metering streams were stopped again. In the subsequent after-reaction phase of 70 min duration, the pressure dropped slowly to 0.8 bar. At this point in time, a total of only 469 g propylene oxide had been metered in, the experiment was discontinued.

Example 17

0.41 g DMC catalyst was added to 666.0 g of the product from Example 13, containing 103 ppm DMC catalyst from its preparation, in a 10-liter autoclave. The contents of the reactor were then heated up to 60° C. and stripped for 30 min, while stirring (450 rpm) and while passing through nitrogen (50 ml/min). 66.6 g propylene oxide were then added to the reactor at 60° C. The pressure rose to 0.6 bar during this operation. The contents of the reactor were then stirred under this pressure at 60° C. for a further 60 min. Thereafter, the mixture was heated to 130° C., the pressure rising to 2.0 bar. The subsequent activation of the DMC catalyst manifested itself by an accelerated drop in pressure. When the activation of the catalyst had taken place, a further 2,474.8 g propylene oxide were metered into the autoclave with a constant 675.5 g/hr. After a total of 150 g propylene oxide (including the amount employed for activation of the catalyst) had been metered, metering of 792.0 g propylene glycol (containing 280 ppm water and 106 ppm phosphoric acid) was started with a constant metering rate of 250 g/hr. When the metering in of the propylene oxide had ended, the mixture was left to after-react for a further 28 min at 130° C., and the product was finally heated thoroughly at 130° C. in vacuo for 30 min. The maximum propylene oxide partial pressure, determined from the difference between the maximum reactor pressure and the pressure level reached at the end of the after-reaction phase, was 1.5 bar. The OH number of the product was 347.6 mg KOH/g.

Example 18

0.40 g DMC catalyst was added to 334.9 g of the product from Example 15, containing 120 ppm DMC catalyst from its preparation, in a 10-liter autoclave. The contents of the reactor were then heated up to 60° C. and stripped for 30 min, while stirring (450 rpm) and while passing through nitrogen (50 ml/min). 33.3 g propylene oxide were then added to the reactor at 60° C. The pressure rose to 0.48 bar during this operation. The contents of the reactor were then stirred under this pressure at 60° C. for a further 60 min. Thereafter, the mixture was heated to 130° C., the pressure rising to 1.2 bar. The subsequent activation of the DMC catalyst manifested itself by an accelerated drop in pressure. When the activation of the catalyst had taken place, a further 2,763.1 g propylene oxide were metered into the autoclave with a constant 703 g/hr. After a total of 75 g propylene oxide (including the amount employed for activation of the catalyst) had been metered, metering of 869.9 g propylene glycol (containing 280 ppm water and 106 ppm phosphoric acid) was started with a constant metering rate of 250 g/hr. When the metering in of the propylene oxide had ended, the mixture was left to after-react for a further 20 min at 130° C., and the product was finally heated thoroughly at 130° C. in vacuo for 30 min. The maximum propylene oxide partial pressure, determined from the difference between the maximum reactor pressure and the pressure level reached at the end of the after-reaction phase, was 0.85 bar. The OH number of the product was 348.5 mg KOH/g.

The test parameters and the test results of Examples 15 to 18 are summarized below in Table III.

TABLE III

| Example | Conditioning | | | Catalyst conc. [ppm] | OH # [mg KOH/g] | Max. PO partial press. [bar] |
| --- | --- | --- | --- | --- | --- | --- |
| | | Temp. [° C.] | Time [min] | | | |
| 15 | yes | 60 | 90 | 103 | 347.7 | 1.26 |
| C-16 | no | — | — | 103 | reaction discontinued | reaction discontinued |
| 17 | yes | 60 | 90 | 120 | 347.6 | 1.50 |
| 18 | yes | 60 | 90 | 110 | 348.5 | 0.85 |

Catalyst concentration in Table III above is given with respect to the end product.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for conditioning double metal cyanide catalysts, in which the double metal cyanide (DMC) catalysts are dispersed in starting media having an OH number of from about 5 to about 500 mg KOH/g, said starting media being selected from the group consisting of addition products of starter compounds having Zerewitinoff-active hydrogen atoms and alkylene oxides, poly(ester) polyols, polycarbonate polyols, hydroxylated triglycerides, hydroxylated fatty acid derivatives and mixtures thereof, at a temperature of from about 0° C. to about 80° C. over a period of from about 5 minutes to about 4 hours under pressures of from about 1 mbar to about 10 bar.

2. The process according to claim 1, wherein the conditioning is carried out under an inert gas atmosphere.

3. The process according to claim 1, wherein the conditioning is carried out under an atmosphere containing inert gas and alkylene oxide.

\* \* \* \* \*